(12) United States Patent
Tsuruma

(10) Patent No.: US 11,799,302 B2
(45) Date of Patent: Oct. 24, 2023

(54) POWER CONVERSION SYSTEM

(71) Applicant: TOSHIBA MITSUBISHI-ELECTRIC INDUSTRIAL SYSTEMS CORPORATION, Chuo-ku (JP)

(72) Inventor: Yoshinori Tsuruma, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 178 days.

(21) Appl. No.: 16/972,274

(22) PCT Filed: May 29, 2019

(86) PCT No.: PCT/JP2019/021378
§ 371 (c)(1),
(2) Date: Dec. 4, 2020

(87) PCT Pub. No.: WO2020/240742
PCT Pub. Date: Dec. 3, 2020

(65) Prior Publication Data
US 2022/0115888 A1    Apr. 14, 2022

(51) Int. Cl.
*H02J 7/00* (2006.01)
*H02M 7/04* (2006.01)

(52) U.S. Cl.
CPC ........ *H02J 7/00306* (2020.01); *H02J 7/0048* (2020.01); *H02M 7/043* (2013.01)

(58) Field of Classification Search
CPC ........ H02J 7/00306; H02J 7/0048; H02J 3/16; H02J 3/32; H02J 3/46; H02J 7/007182;
(Continued)

(56) References Cited

U.S. PATENT DOCUMENTS 8,207,632 B2 * 6/2012 Shimomura ............ H02J 9/062
307/64

FOREIGN PATENT DOCUMENTS

JP    57-193977 A    11/1982
JP    5865657 B2     2/2016
(Continued)

OTHER PUBLICATIONS

International Search Report dated Jul. 23, 2019 in PCT/JP2019/021378 filed on May 29, 2019.
(Continued)

*Primary Examiner* — Stacy Whitmore
(74) *Attorney, Agent, or Firm* — Oblon, McClelland, Maier & Neustadt, L.L.P.

(57) ABSTRACT

The power conversion system includes a power conversion circuit, a power conversion control circuit including a charging control mode, and a command value generating part. The charging control mode is a mode in which the output voltage of the power conversion circuit is controlled so that an interconnection inductance receives an interconnection inductance voltage determined by the power supply voltage vector of the AC power supply and the voltage command value vector having a delay phase with respect to the power supply voltage vector and having a magnitude and a phase based on the command value. The command value generating part generates a second command value for operation of the charging control mode when the voltage of the storage battery falls below the over-discharge threshold.

15 Claims, 17 Drawing Sheets

(58) Field of Classification Search
CPC .......... H02J 7/06; H02M 7/043; H02M 1/082; H02M 1/325; H02M 7/219; H02M 7/5395; H02M 7/79; H02M 1/0009; H02M 7/797
See application file for complete search history.

(56) References Cited

FOREIGN PATENT DOCUMENTS

| | | | |
|---|---|---|---|
| JP | 2016-82620 A | 5/2016 | |
| WO | WO-2012096197 A2 * | 7/2012 | ............ H02J 7/0065 |
| WO | WO 2013/018209 A1 | 2/2013 | |
| WO | WO 2014/024560 A1 | 2/2014 | |

OTHER PUBLICATIONS

Office Action dated Jan. 5, 2022 in corresponding Indian Patent Application No. 202017055316 (with English Translation), 7 pages.

* cited by examiner

THREE-PHASE
AC WAVE
AND
TRIANGLE WAVE

STORAGE DISCHARGING

STORAGE CHARGING

POWER CONVERSION SYSTEM

TECHNICAL FIELD

The present application relates to a power conversion system.

BACKGROUND

Conventionally, as described in, for example, Japanese Patent Application Laid-Open No. 57-193977, a power conversion device configured to stop an operation of an inverter when an output voltage of a secondary battery drops has been known. In the power conversion device according to the above-mentioned publication, when the output voltage of the secondary battery drops and reaches an inverter stop level, a stop command is applied to a gate signal generating circuit. In response to this, the gate signal generating circuit stops the operation of the inverter and opens a switch to prevent over-discharge of the secondary battery.

CITATION LIST

Patent Literature

[PTL1] JP 57-193977 A

SUMMARY

Technical Problem

In the prior art, when the output voltage of a secondary battery (i.e. a storage battery) reaches the inverter stop level, the operation of an inverter circuit is stopped. Such an operation also serves as a measure to prevent over-discharge of the storage battery.

Despite such measures, over-discharge of the storage battery may occur. An example of a case in which over-discharge occurs is a case in which the storage battery is kept for a certain period or longer in a condition in which the storage battery is not used. In particular, when the storage battery is kept in a state of being discharged to the vicinity of a lower limit of SOC, energy of the storage battery becomes lowered by natural discharge or the like, so that the storage battery may become over-discharged.

Normally, a power conversion device is configured so that a charging operation mode for charging the storage battery can be implemented. However, when the storage battery reaches an over-discharge state, an output current waveform of the power conversion device is adversely affected by a shortage of a DC voltage of the storage battery.

For the above reasons, in the prior art, it is common that the power conversion device is stopped when the storage battery is in an over-discharge state. In order to charge over-discharged storage batteries in such a stopped state of the power conversion device, an operation of individually charging each storage batteries has been performed.

There is a problem that such an individual charging operation requires work time and labor. Especially, in a power conversion system having a large storage battery capacity to some extent, there is a problem that such work time and labor become remarkable.

The present application has been made to solve the above-mentioned problems, and an object thereof is to provide an improved power conversion system capable of reducing the labor required for charging the electric storage in an over-discharged state.

Solution to Problem

The power conversion system according to the present application includes: a power conversion circuit having a DC side connected to a storage battery and having an AC side connected to an AC power source via an interconnection inductance; a power conversion control circuit including a charging control mode for controlling the power conversion circuit to take power from a side of the interconnection inductance to the storage battery via the power conversion circuit; and a command value generating part configured to generate a command value for executing the charging control mode.

The charging control mode included in the power conversion control circuit is a mode for controlling the output voltage of the power conversion circuit such that an interconnection inductance voltage is applied to the interconnection inductance, and the interconnection inductance voltage is determined by a power supply voltage vector of the AC power supply and a voltage command value vector having a delay phase with respect to the power supply voltage vector and having a magnitude and a phase based on the command value.

The command value generating part generates a first command value for an operation of the charging control mode when a voltage of the storage battery is not lower than a predetermined over-discharge threshold value, and generates a second command value for an operation of the charging control mode when the voltage of the storage battery is lower than the over-discharge threshold value, the first command value is a command value for causing the power conversion circuit to output an output voltage corresponding to a first voltage command value vector having a first magnitude and a first delay phase, and the second command value is a command value for causing the power conversion circuit to output an output voltage corresponding to a second voltage command value vector having a second magnitude smaller than the first magnitude.

It should be noted that the interconnection inductance includes a reactor or a transformer.

Advantageous Effects of Invention

According to the present application, even when the storage battery is over-discharged, it is possible to generate an appropriate charging current in accordance with the second command value to achieve the second voltage command value vector. Since the second voltage command value vector is set to be shorter than the first voltage command value vector, an inverter voltage amplitude can be reduced. As a result, it is possible to charge the storage battery by operating the power conversion circuit while suppressing occurrence of inverter overmodulation caused by a voltage shortage of the storage battery. Since the storage battery can be charged by the power conversion circuit even when the storage battery is over-discharged, it is not necessary to rely on the operation of manually charging the storage battery individually. As a result, it is possible to reduce the labor required to charge the over-discharged storage battery.

DESCRIPTION OF EMBODIMENTS

[System Configuration of Embodiment]

Figure 1:
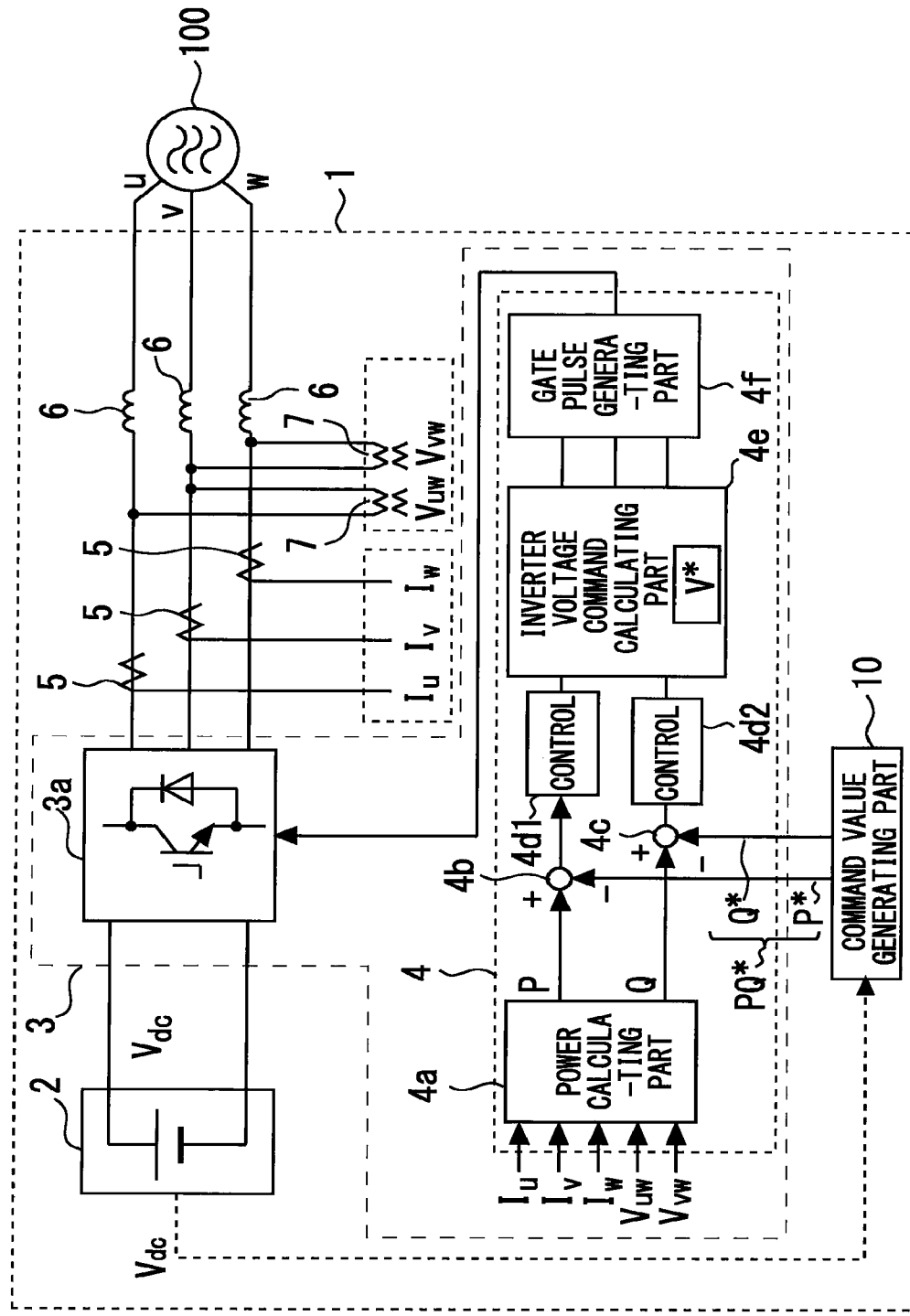
FIG. 1 is a schematic configuration diagram of a power conversion system according to an embodiment.

FIG. 1 is a schematic configuration diagram showing a power conversion system 1 according to an embodiment. The power conversion system 1 is connected to an AC power source 100. The AC power supply 100 according to the embodiment is an electric power grid for outputting three-phase AC.

The power conversion system 1 includes a storage battery 2, a power conversion device 3, a plurality of current transformers 5, a plurality of potential transformers 7, a plurality of interconnection reactors 6 as interconnection inductances, and a command value generating part 10. The power conversion device 3 includes a power conversion circuit 3a and a power conversion control circuit 4.

The storage battery 2 includes a storage battery main body and a battery management unit (BMU) for managing the state of the storage battery main body. Various types of storage batteries, such as a lead storage battery, a lithium ion storage battery, or a sodium sulfur battery, can be applied to the storage battery body. In the embodiment, it is assumed that the capacity of the storage battery main body is large to some extent. For example, a single storage battery body may be constructed by connecting a plurality of unit storage batteries, and a large-capacity storage battery may often take such a form.

Figure 2:
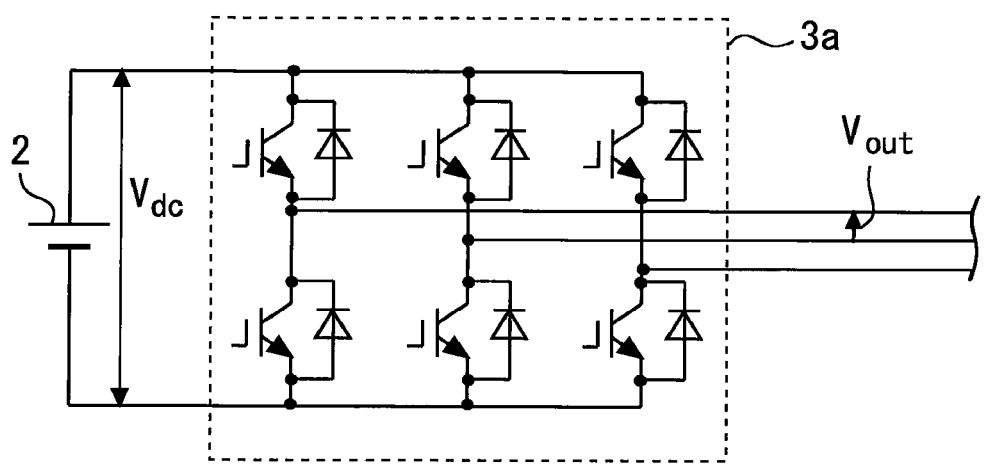
FIG. 2 is a schematic circuit diagram of a power conversion circuit included in the power conversion system according to the embodiment.

A DC-side of the power conversion circuit 3a is connected to the storage battery 2. FIG. 2 is a schematic circuit diagram of the power conversion circuit 3a included in the power conversion system 1 according to the embodiment. The power conversion circuit 3a in the embodiment is a one-level voltage-type three-phase inverter circuit. However, the present invention is not limited to this, and may be a single-phase or two-phase inverter circuit, or may be a multi-level inverter circuit including two-level or three-level inverter circuits.

The power conversion control circuit 4 includes a power calculating part 4a, an active power subtracting part 4b, a reactive power subtracting part 4c, an active power control part 4d1, a reactive power control part 4d2, an inverter-voltage command calculating part 4e, and a gate pulse generating part 4f.

The power calculating part 4a calculates a measured value of an active power and a measured value of a reactive power, based on the measured values of the plurality of potential transformers 7 and the measured values of the plurality of current transformers 5. The power conversion control circuit 4 receives a command value PQ* from the command value generating part 10. The command value PQ* includes an active power command value P* and a reactive power command value Q*.

The active power subtracting part 4b calculates a difference between an active power measurement value P and the active power command value P* from the power calculating part 4a. The reactive power subtracting part 4c calculates the difference between a reactive power measurement value Q and the reactive power command value Q* from the power calculating part 4a.

The active power control part 4d1 performs a well-known feedback control on the output values of the active power subtracting part 4b. The reactive power control part 4d2 performs a known feedback control on the output value of the reactive power subtracting part 4c. For each feedback control, any one of PI control, P control, and PID control can be used.

The inverter voltage command calculating part 4e generates a voltage command value for three phases based on the active power command value from the active power control part 4d1 and the reactive power command value from the reactive power control part 4d2. The gate pulse generating part 4f generates a gate driving PWM signal to the switching elements of the power conversion circuit 3a based on the three-phase voltage command values from the inverter voltage command calculating part 4e.

The power conversion control circuit 4 includes a charging control mode and a discharging control mode. The power conversion control circuit 4 can selectively execute the "charging control mode" and the "discharging control mode" in accordance with the content of the command value PQ* from the command value generating part 10.

The charging control mode is a mode for controlling the power conversion circuit 3a so as to take in power from the interconnection reactor 6 side to the storage battery 2 via the power conversion circuit 3a. The discharging control mode is a mode for controlling the power conversion circuit 3a so as to discharge the power of the storage battery 2 from the storage battery 2 to the interconnection reactor 6 side via the power conversion circuit 3a. Details of each mode will be described later.

The plurality of current transformers 5 are provided in three-phase output-side wires of the power conversion circuit 3a, respectively. The plurality of current transformers 5 measure currents of three phases, i.e., U phase, V phase, and W phase, respectively. The plurality of potential transformers 7 are provided in the three-phase output-side wires of the power conversion circuit 3a. The plurality of potential transformers 7 measure the voltage between the three phases.

The plurality of interconnection reactors 6 are respectively interposed between each of the three-phase AC sides of the power conversion circuit 3a and the AC power source 100.

The command value generating part 10 is configured to generate the command value PQ*. The command value generating part 10 according to the embodiment is a high-order control device that performs a higher-level control than the power conversion device 3 in the power conversion system 1. In the embodiment, as an example, it is assumed that the command value generating part 10 is a so-called main site controller (MSC).

In the embodiment, signals representing a voltage $V_{dc}$ of the storage battery 2 are transmitted to at least the command value generating part 10. The battery management unit may acquire a remaining capacity of the storage battery main body, the voltage $V_{dc}$, and the like, and may transmit the acquired remaining capacity and the voltage to the command value generating part 10. Alternatively, the voltage $V_{dc}$ of the storage battery 2 may be measured by a DC voltmeter provided inside the power conversion circuit 3a, and in this case, the voltage $V_{dc}$ may be transmitted from the power conversion circuit 3a to the command value generating part 10.

Figure 3:
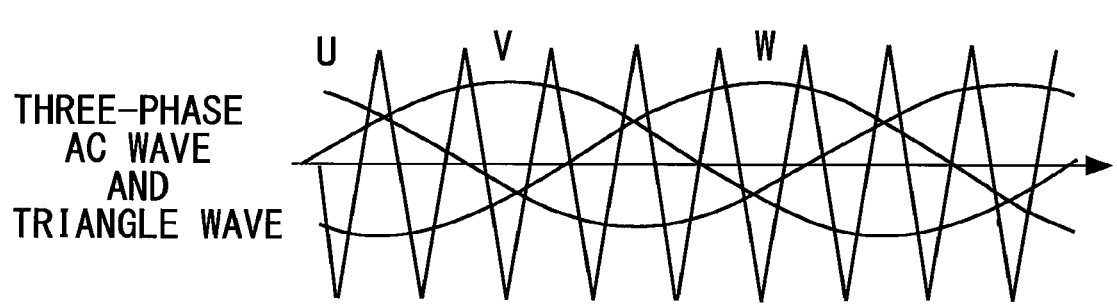
FIG. 3 is a diagram showing an example of a control signal supplied to the power conversion circuit of the power conversion system according to the embodiment.

FIG. 3 is a diagram showing examples of control signals supplied to the power conversion circuit 3a of the power conversion system 1 according to the embodiment. As shown in FIG. 2, the power conversion circuit 3a of the embodiment is a two-level voltage-type three-phase inverter circuit. FIG. 3 shows a carrier triangular wave. A pulse width modulated signal (PWM signal), which is not shown in the Figure, is generated based on the voltage command value waveform of each of the U phase to the W phase and the carrier triangular wave. This PWM signal becomes a gate driving signal. The gate pulse generating part 4f inputs the gate driving signals to six switching elements, respectively. Thereby, as shown in FIG. 3, three-phase AC waveforms of the U phase, the V phase, and the W phase are generated.

Figure 4:
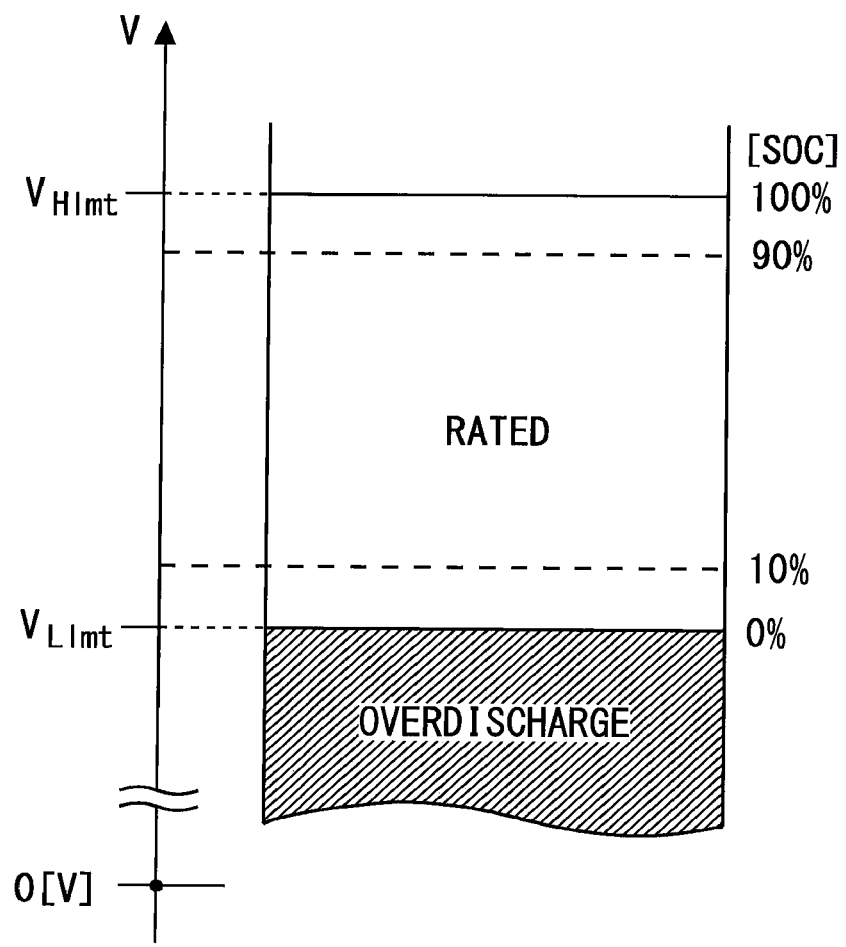
FIG. 4 is a diagram for explaining an over-discharge state of a storage battery charged and discharged by the power conversion system according to the embodiment.

FIG. 4 is a diagram for explaining an over-discharge state of the storage battery 2 charged and discharged by the power conversion system 1 according to the embodiment. The remaining capacity of the storage battery 2 is generally expressed as SOC (State of charge).

In FIG. 4, a storage battery voltage associated with the SOC of 0% is referred to as a "lower limit voltage set value $V_{Llmt}$". The lower limit voltage set value $V_{Llmt}$ is set at a voltage level somewhat higher than zero volts. In FIG. 4, the storage battery voltage corresponding to a condition in which the SOC is 100% is referred to as an "upper limit voltage set value $V_{Hlmt}$". The upper limit voltage set value $V_{Hlmt}$ is set to a voltage level which is lower than a physical upper limit voltage level of the storage battery 2 to some extent.

A physical limit range of the storage battery 2 is a range from zero volts to the physical upper limit voltage value. However, the range of the SOC is set to a range somewhat narrower than the physical limit range of the storage battery 2 so that the storage battery 2 can be used with high reliability. A situation in which the remaining capacity of the storage battery 2 is lower than SOC=0% should be avoided.

However, an inappropriate case may occur in which the remaining capacity of the storage battery 2 is lower than 0% due to, for example, long-term storage in nonuse. For example, the state in which the remaining capacity of the storage battery 2 is lower than SOC=0% is a state in which the voltage of the storage battery 2 is lower than the lower limit voltage set value $V_{Llmt}$. Such a state is an example of an "over-discharge state".

Figure 5:
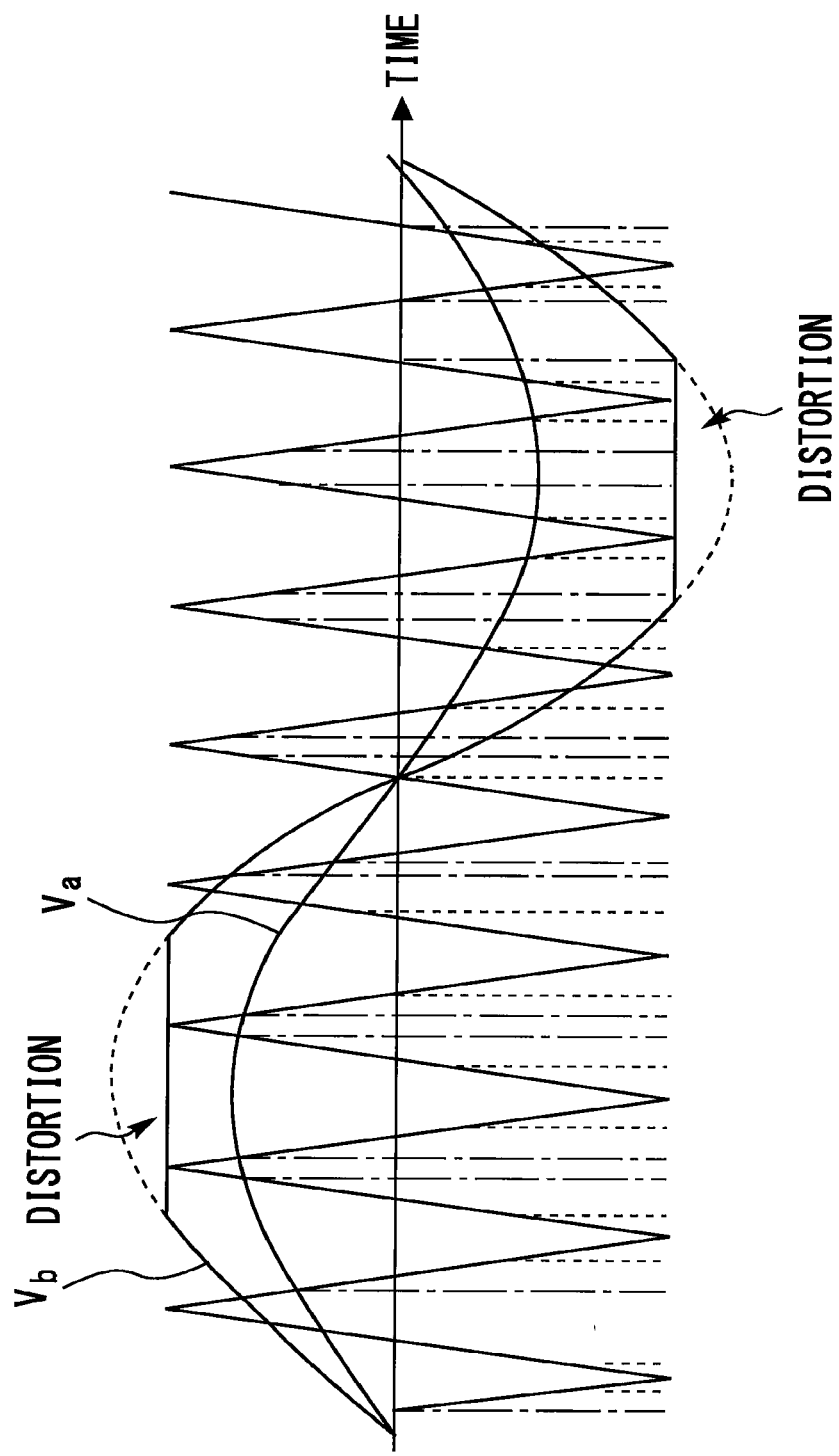
FIG. 5 is a diagram for explaining a problem of inverter overmodulation.

FIG. 5 is a diagram for explaining the problem of inverter overmodulation. A normal inverter voltage Va and an overmodulation inverter voltage $V_b$ are compared and illustrated. One of the factors causing the overmodulation inverter voltage $V_b$ is that control is performed to increase an output voltage command value of the power conversion circuit 3a beyond an appropriate range when the voltage $V_{dc}$ of the storage battery 2 is too low.

More specifically, in the above-described over-discharge state, the voltage of the storage battery 2 is lower than the lower limit voltage set value $V_{Llmt}$. A normal use range of the storage battery 2 is a range in which the SOC is 0% to 100%. The power conversion circuit 3a is usually designed to meet this requirements. That is, a normal range of an input DC voltage of the power conversion circuit 3a is usually set to a range from the lower limit voltage set value $V_{Llmt}$ to the upper limit voltage set value $V_{Hlmt}$ of the storage battery 2.

A low voltage $V_{dc}$ caused by the over-discharge state usually deviates from a rated DC voltage range assumed in a design process of the power conversion circuit 3a. As a result, in the over-discharge condition, the voltage $V_{dc}$ of the storage battery 2 is too low, so that the overmodulated inverter voltage $V_b$ occurs. When the overmodulated inverter voltage $V_b$ occurs, the output current of the power conversion circuit 3a includes a higher harmonic wave, which is not preferable.

[Operation of the Apparatus of Embodiments]

Figure 6:
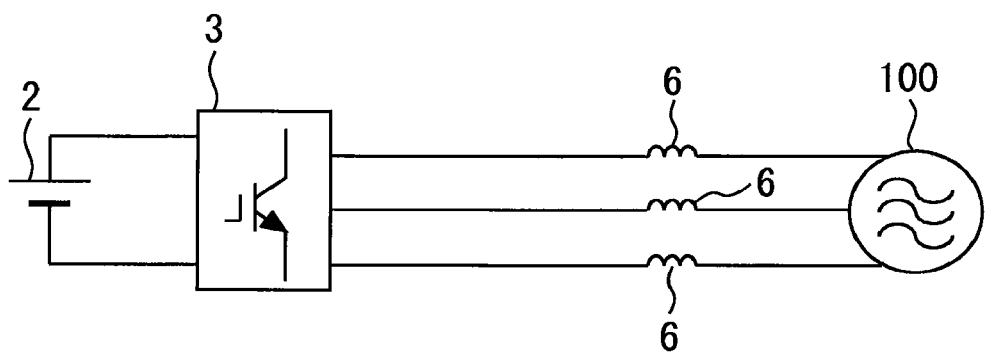
FIG. 6 is a simplified model diagram for explaining the operation of the power conversion system according to the embodiment.
Figure 7:
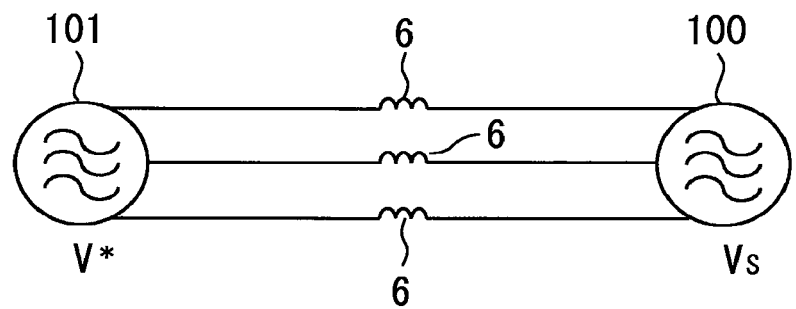
FIG. 7 is a simplified model diagram for explaining the operation of the power conversion system according to the embodiment.

FIGS. 6 and 7 are simplified model diagrams for explaining the operation of the power conversion system 1 according to the embodiment. As schematically shown in FIG. 6, in the power conversion system 1 according to the embodiment, the power conversion circuit 3a generates three-phase AC power from the storage battery 2. When the storage battery 2 and the power conversion circuit 3a are simulated by a three-phase AC voltage source 101, the system shown in FIG. 6 can be simulated as shown in FIG. 7.

In FIG. 7, the three-phase AC voltage source 101 and the AC power source 100 are connected to each other via the interconnection reactors 6. It is assumed that the three-phase AC voltage source 101 in the schematic diagram of FIG. 7 outputs an output voltage in accordance with a voltage command vector V*, and the AC power source 100 outputs an output voltage in accordance with a power supply voltage vector $V_S$. The voltage command value vector V* can be set to a desired voltage vector by inputting the voltage command value PQ* to the power conversion circuit 3a. The voltage command value vector V* has an amplitude (magnitude) and a phase based on the command value PQ* generated by the command value generating part 10.

FIGS. 8 to 12 are voltage vector diagrams for explaining the operation of the power conversion system 1 according to the embodiment. FIGS. 8 to 11 show vector diagrams of four typical types of operations of the power conversion system 1.

Figure 8:
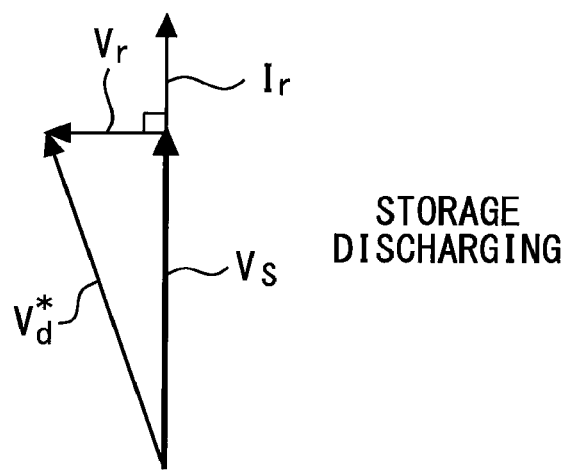
FIG. 8 is a voltage vector diagram for explaining an operation of the power conversion system according to the embodiment.

FIG. 8 shows an example of the discharging control mode of the storage battery 2. A voltage command vector $V^*_d$ having an advance phase with respect to the power supply voltage vector $V_S$ is generated in the three-phase AC voltage source 101. Then, a reactor voltage $V_r$ is generated, and a reactor current $I_r$ whose phase is shifted by 90 degrees with respect to the reactor voltage $V_r$ is generated. Since the reactor current $I_r$ and the power supply voltage vector $V_S$ of FIG. 8 are oriented in the same direction, positive power is generated for the AC power supply 100. Therefore, in the case of FIG. 8, electric power is discharged from the storage battery 2.

Figure 9:
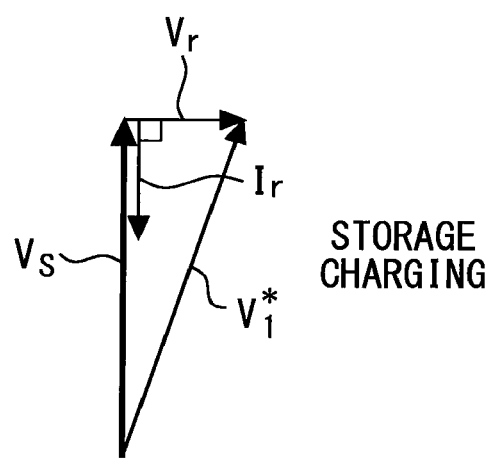
FIG. 9 is a voltage vector diagram for explaining an operation of the power conversion system according to the embodiment.

FIG. 9 shows an example of the charging control mode of the storage battery 2. A voltage command vector $V^*_1$ delayed in phase with respect to the power supply voltage vector $V_S$ is generated in the three-phase AC voltage source 101. As a result, reactor voltages $V_r$ and reactor currents $I_r$ are generated. Since the reactor current $I_r$ and the power supply voltage vector $V_S$ in FIG. 9 are in opposite directions, negative power is generated for the AC power supply 100. Therefore, in the case of FIG. 9, the storage battery 2 absorbs electric power. That is, the storage battery 2 is charged.

In the embodiment, the voltage command value vector $V^*_1$ shown in FIG. 9 is also referred to as a "first voltage command value vector $V^*_1$". The first voltage command vector $V^*_1$ is a voltage vector having a first magnitude and a first delay phase $\theta_1$.

Figure 10:
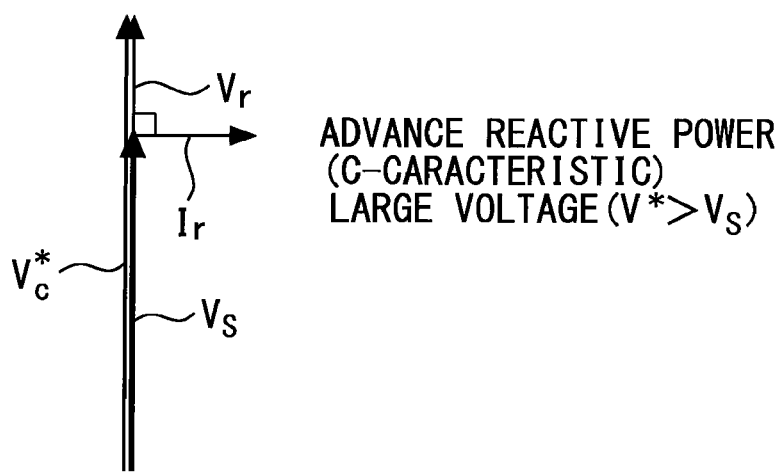
FIG. 10 is a voltage vector diagram for explaining an operation of the power conversion system according to the embodiment.

FIG. 10 shows an example of the voltage command value vector to which advance reactive power is given. In other words, the example of FIG. 10 is an example of a voltage command value vector having a C-characteristic. When the amplitude (magnitude) of the voltage command value vector V* is made larger than the power supply voltage vector $V_S$, the reactor voltage $V_r$ extends from the end point of the power supply voltage vector $V_S$ to an extension line thereof as shown in FIG. 10.

Figure 11:
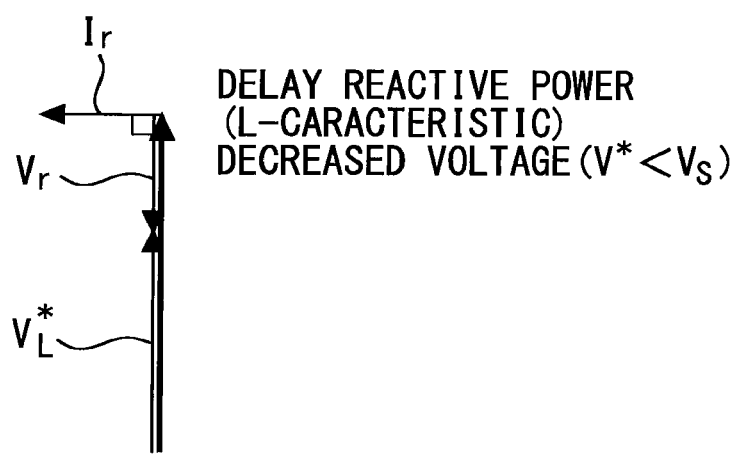
FIG. 11 is a voltage vector diagram for explaining an operation of the power conversion system according to the embodiment.

FIG. 11 is an example of a voltage command value vector to which a delayed reactive power is applied. In other words, the example of FIG. 11 is an example of a voltage command value vector having a L-characteristic. When the amplitude (magnitude) of the voltage command value vector V* is made smaller than the power supply voltage vector $V_S$, a reactor voltage $V_r$ is generated so as to extend from the end point of the power supply voltage vector $V_S$ in the opposite direction to the power supply voltage vector $V_S$ as shown in FIG. 11.

The "charging control mode" in the power conversion control circuit 4 according to the embodiment is a mode in which the output voltage of the power conversion circuit 3a is controlled so that the reactor 6 receives the reactor voltage determined by the power supply voltage vector $V_S$ and the voltage command value vector V*. The first voltage command vector $V^*_1$ shown in FIG. 9 is an example of the charging control mode according to the embodiment.

In order to suppress the problem of the inverter overmodulation shown in FIG. 5, it is effective to suppress the voltage command value by making the voltage command value vector V* smaller. Therefore, the first voltage command value vector $V^*_1$ is modified so as to have a second magnitude smaller than the first magnitude in order to suppress the inverter overmodulation, and the modified vector is referred to as a "second voltage command value vector $V^*_2$".

In the embodiment, one second voltage command value vector $V^*_2$ is assumed in advance, and the charging control mode is executed in accordance with the command value PQ for achieving the assumed second voltage command value vector $V^*_2$. However, a modification may be provided in which a plurality of command values PQ* corresponding to each of the plurality of second voltage command value vectors $V^*_2$ are selectively used.

According to the embodiment, even when the storage battery 2 is over-discharged, an appropriate charging current is generated in accordance with a second command value $PQ^*_2$ for achieving the second voltage command value vector $V^*_2$. Since the second voltage command value vector $V^*_2$ is set to be shorter than the first voltage command value vector $V^*_1$, the inverter voltage amplitudes can be reduced. This makes it possible to charge the storage battery 2 by operating the power conversion circuit 3a while suppressing problems of the inverter overmodulation caused by insufficient voltages of the storage battery 2.

Since the storage battery 2 can be charged by the power conversion circuit 3a even when the storage battery 2 is over-discharged, it is not necessary to rely on operation of individually manually charging the storage battery 2 or the like. As a result, it is possible to reduce labor required for charging the electric storage in the over-discharged state.

There are several variations on how small the second voltage command vector $V^*_2$ is to be set. For example, the second voltage command value vector $V^*_2$ may be smaller (i.e. shorter) than the first voltage command value vector V*1, and it may be $V_S < V^*_2 < V^*_1$. The second voltage command vector $V^*_2$ may also be smaller (i.e. shorter) than the power supply voltage vector $V_S$, and it may be $V^*_2 < V_S < V^*_1$.

Figure 13:
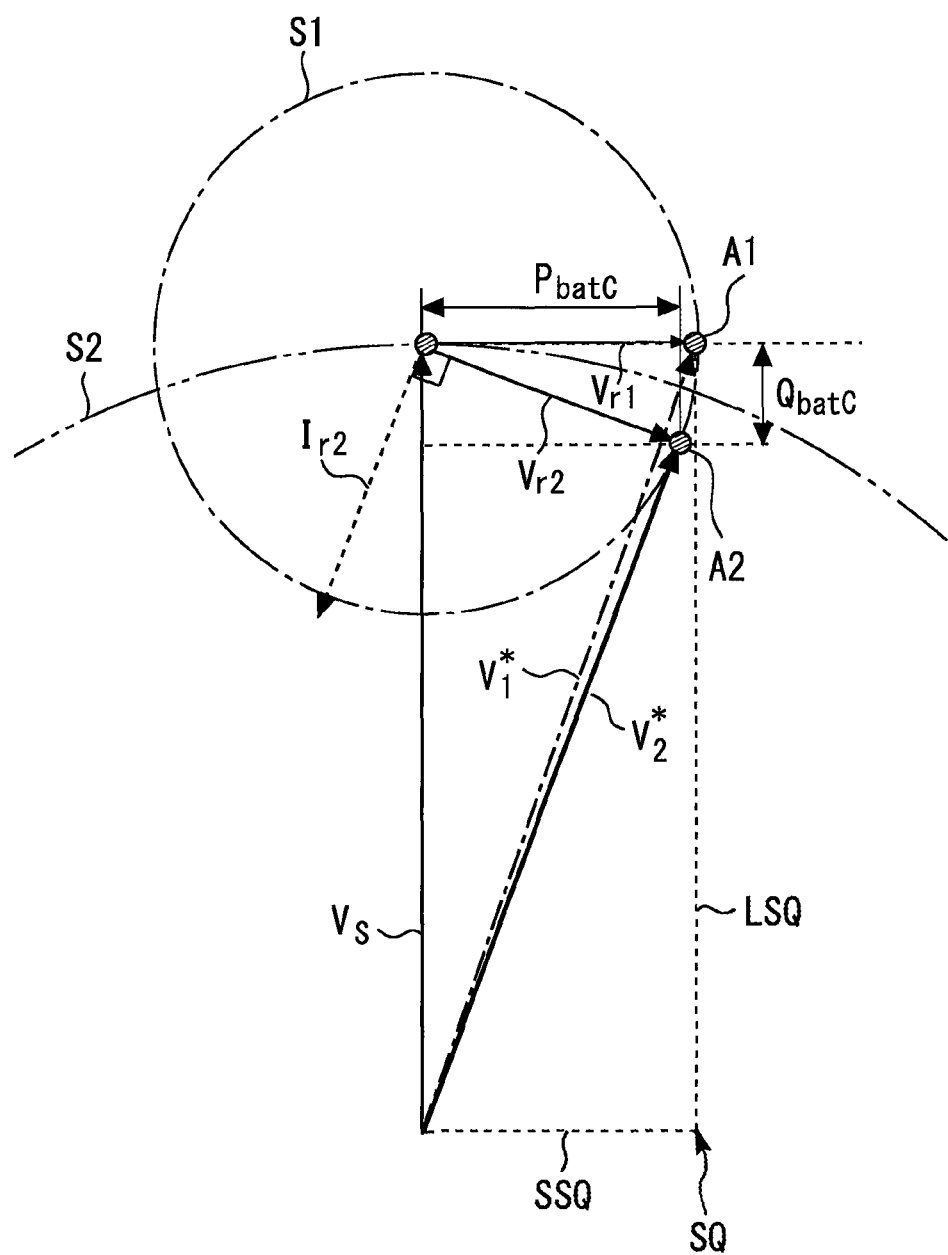
FIG. 13 is a flowchart showing an example of a control routine executed by the power conversion system according to the embodiment.
Figure 15:
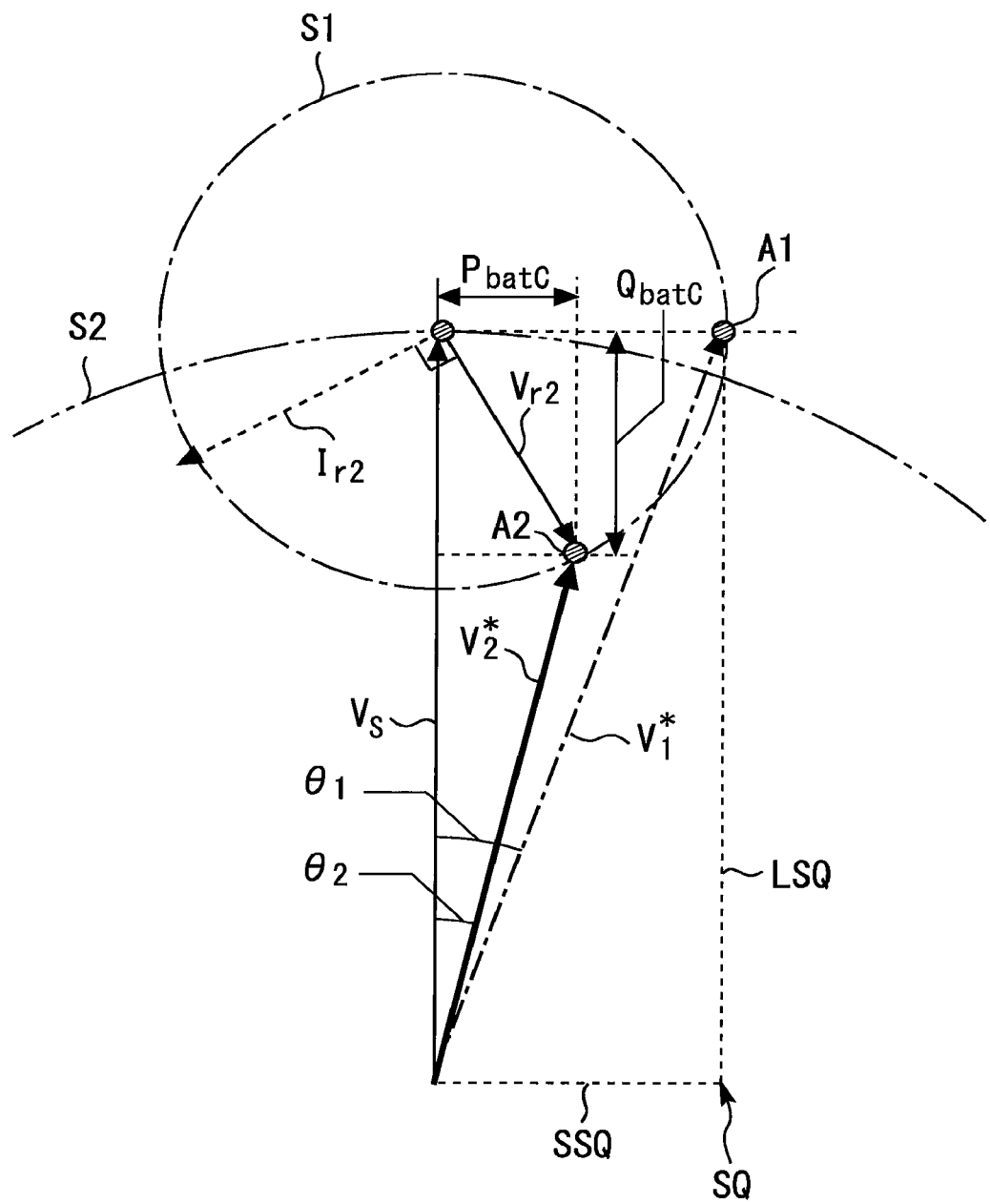
FIG. 15 is a voltage vector diagram for explaining an operation of a power conversion system according to a modification of the embodiment.

There are also several variations in which a second delay phase $\theta_2$ of the second voltage command vector $V^*_2$ is set to any phase. The second delay phase $\theta_2$ of the second voltage command vector $V^*_2$ may be delayed from the first delay phase $\theta_1$ with respect to the power supply voltage vector $V_S$, for example, as shown in FIG. 13, or may be advanced from the first delay phase $\theta_1$, for example, as shown in FIG. 15. Alternatively, the first delay phase $\theta_1$ and the second delay phase $\theta_2$ may be the same (refer to a modification of a third reference intersection point Ax3 described later).

Figure 12:
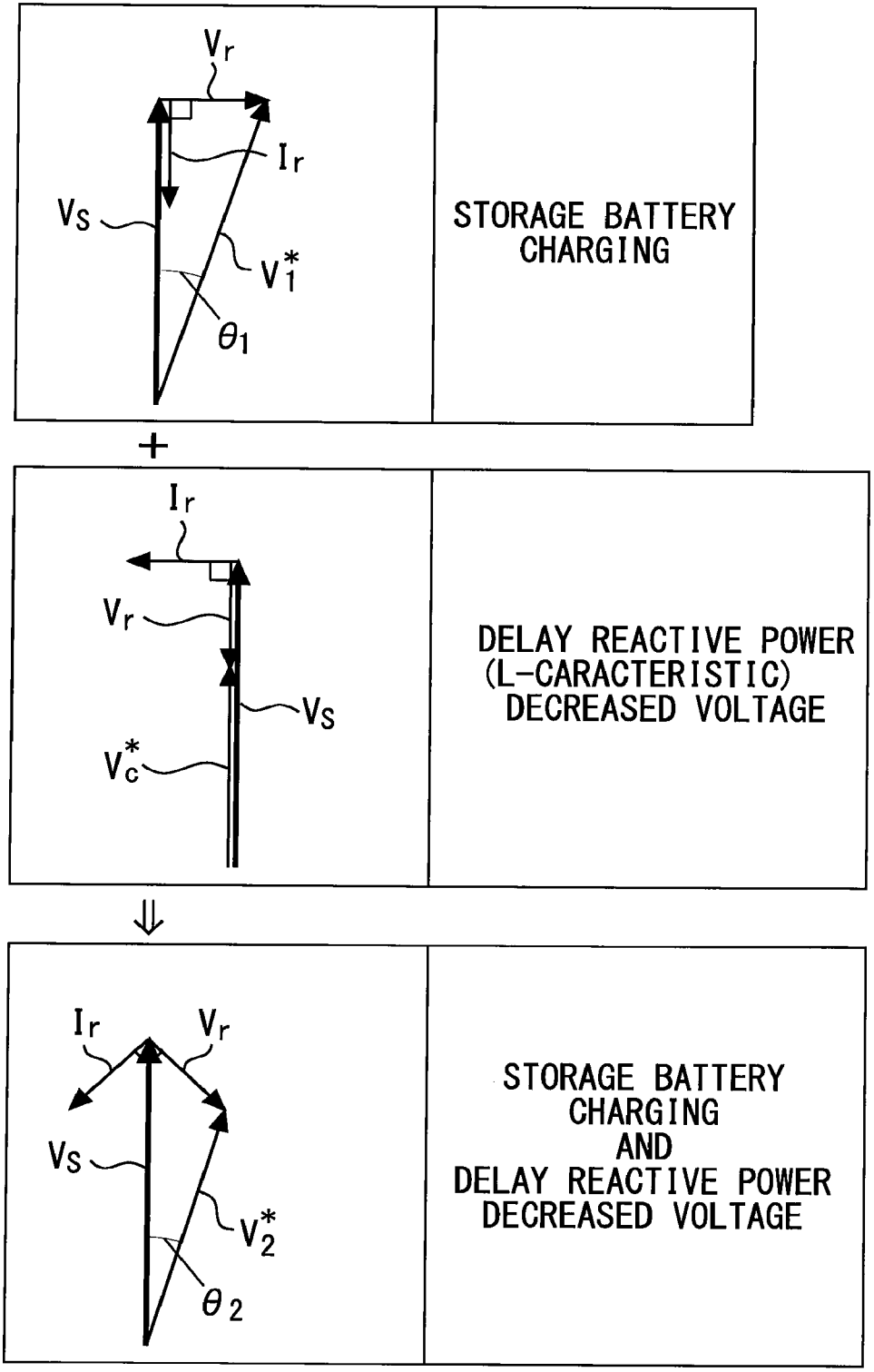
FIG. 12 is a voltage vector diagram for explaining an operation of the power conversion system according to the embodiment.

The inventor of the present application has intensively studied variations of the second voltage command vector $V^*_2$. FIG. 12 is a diagram for explaining an example of an operation performed by the power conversion system 1 according to the embodiment, in the charging control mode when the voltage of the storage battery 2 is lower than the over-discharge threshold. According to the knowledge of the inventor of the present application, among various variations for shortening the second voltage command value vector $V^*_2$, a preferable one is a synthesized vector obtained by synthesizing the voltage command value vector $V^*_1$ for the charge operation shown in FIG. 9 and the voltage command value vector $V^*_C$ having the delayed reactive power shown in FIG. 11. This synthesized vector is the second voltage command value vector $V^*_2$ shown at the bottom of FIG. 12.

Figure 14:
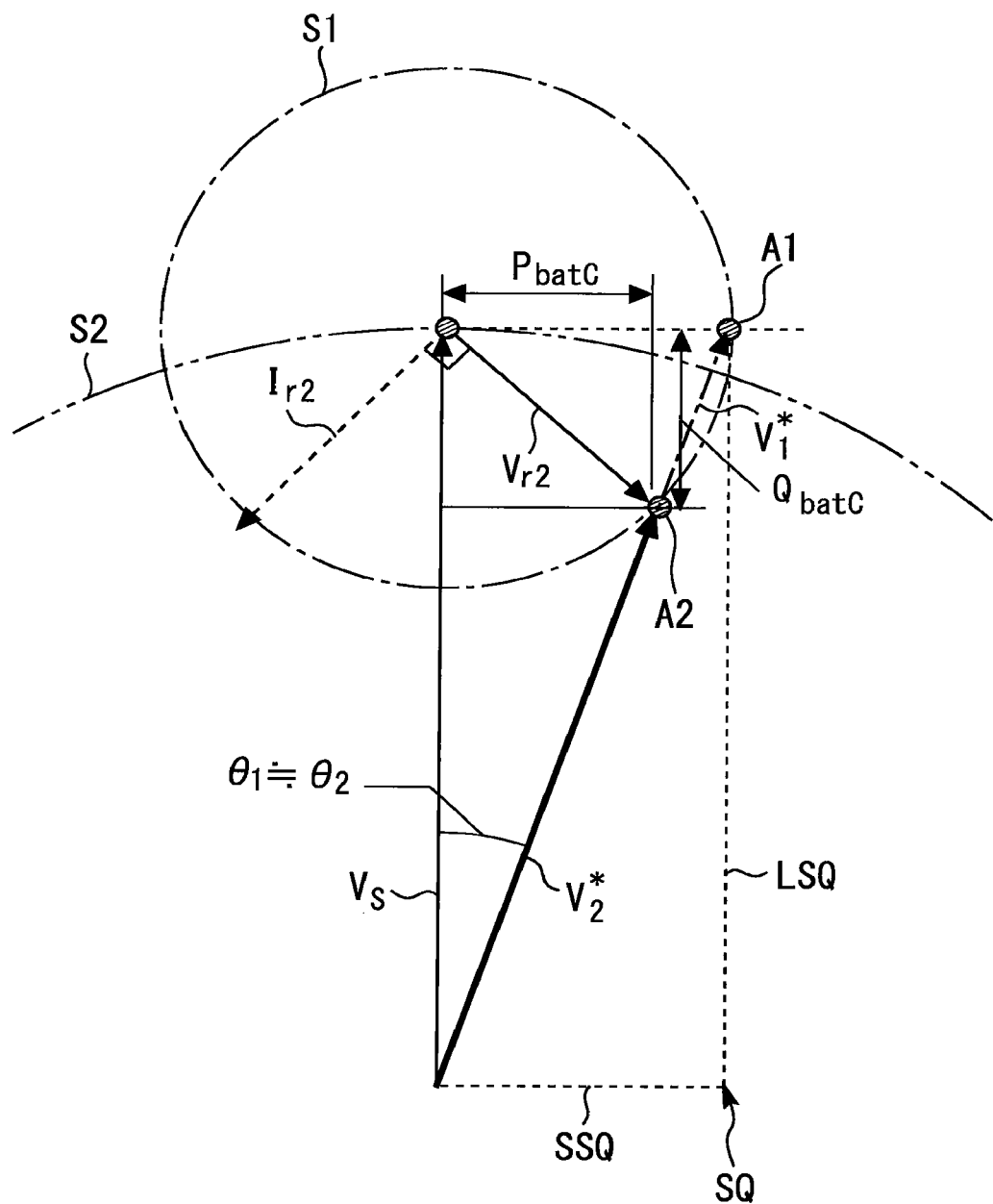
FIG. 14 is a voltage vector diagram for explaining an operation of the power conversion system according to the embodiment.
Figure 16:
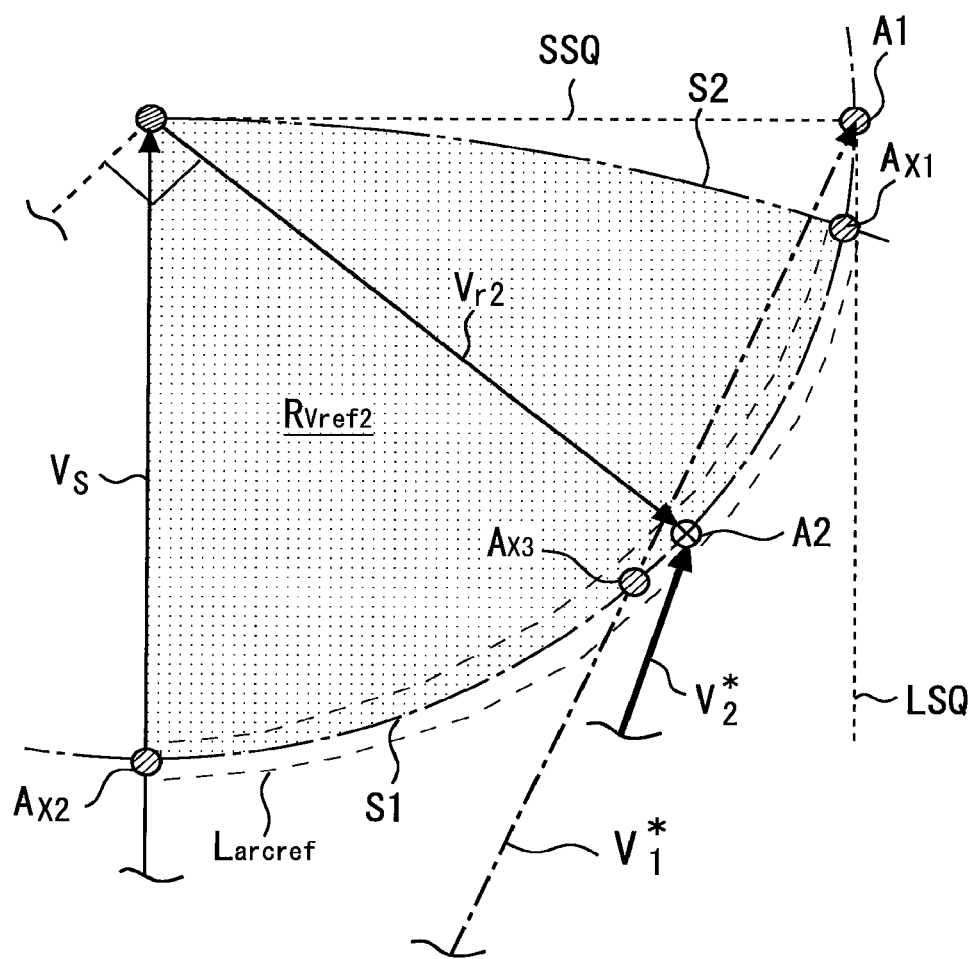
FIG. 16 is a voltage vector diagram for explaining an operation of a power conversion system according to a modification of the embodiment.
Figure 17:
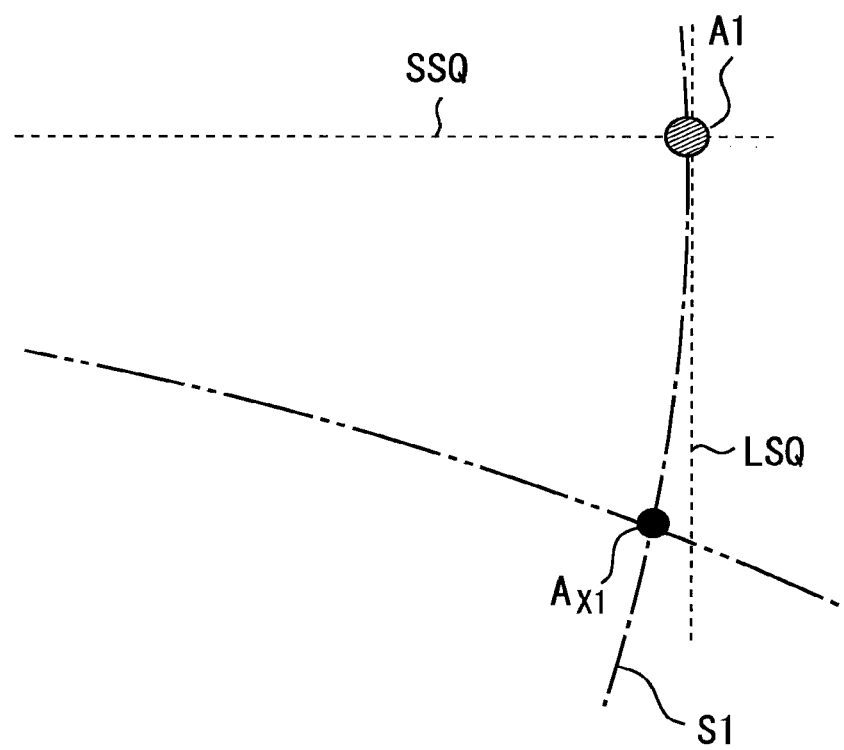
FIG. 17 is a voltage vector diagram for explaining an operation of a power conversion system according to a modification of the embodiment.

FIGS. 13 to 17 are voltage vector diagrams for explaining the operation of the power conversion system 1 according to the embodiment. FIGS. 13 to 17 illustrate variations of the second voltage command vector $V^*_2$. FIG. 16 is a partial enlarged view of FIG. 14, and FIG. 17 is a partial enlarged view of FIG. 16. It should be noted that, while the first delay phase $\theta_1$ and the second delay phase $\theta_2$ are shown in FIGS. 15 and 16, they are omitted in FIG. 14 for convenience, but the second delay phase $\theta_2$ is slightly larger than the first delay phase $\theta_1$ in FIG. 14.

FIG. 13 illustrates the power supply voltage vector $V_S$, the first voltage command value vector $V^*_1$, the second voltage command value vector $V^*_2$, a first reactor voltage vector $V_{r1}$, a first reactor current vector $I_{r1}$, a first imaginary circle S1, and a second imaginary circle S2.

A start point of the second voltage command value vector $V^*_2$ is the same as a start point of the first voltage command value vector $V^*_1$. An end point of the second voltage command value vector $V^*_2$ is the end point A2. The first reactor voltage vector $V_{r1}$ is a voltage vector representing a reactor voltage caused by composing the power supply voltage vector $V_s$ and the first voltage command vector $V^*_1$. The second reactor voltage vector $V_{r2}$ is a voltage vector representing a reactor voltage caused by composing the power supply voltage vector Vs and the second voltage command vector $V^*_2$.

The first imaginary circle S1 is an imaginary circle consisting of a locus of the end point of the first reactor voltage vector $V_{r1}$ when the end point of the first reactor voltage vector $V_{r1}$ turns around the start point of the first reactor voltage vector $V_{r1}$. The second imaginary circle S2 is an imaginary circle consisting of a locus of the end point of the power supply voltage vector $V_S$ when the end point of the power supply voltage vector $V_S$ turns around the start point of the power supply voltage vector $V_S$.

As shown in FIGS. 13 to 16, the command value generating part 10 may generate the second command value $PQ^*_2$ so that the end point A2 of the second voltage command value vector $V^*_2$ overlaps with a circumference of the first imaginary circle S1.

Comparing vector lengths in the vector diagrams of FIGS. 13 to 15, there is a difference that an active power component vector $P_{batC}$ and a reactive power component vector $Q_{batC}$ have the same length in FIG. 14, FIG. 13 illustrates $P_{batC} > Q_{batC}$, and FIG. 15 illustrates $P_{batC} < Q_{batC}$. The active power component vector $P_{batC}$ is a component of the second reactor voltage vector $V_{r2}$ contributing to an active power of the storage battery charge power. The reactive power component vector $Q_{batC}$ is a component of the second reactor voltage vector $V_{r2}$ contributing to a reactive power of the storage battery charge power.

In FIGS. 13 to 16, the magnitude of the reactive power differs for each of the second voltage command vector $V^*_2$. Among FIGS. 13 to 16, the reactive power component vector $Q_{batC}$ shown in FIG. 13 is the smallest, and the reactive power component vector $Q_{batC}$ shown in FIG. 15 is the largest. The second voltage command vector $V^*_2$ may be adjusted according to the magnitude of allowable reactive power.

Further, in FIGS. 13 to 16, the magnitude of the active power component vector $P_{batC}$ of each of the second voltage command value vectors $V^*_2$ differs. Among FIGS. 13 to 16, the active power component vector $P_{batC}$ shown in FIG. 13 is the largest, and the active power component vector $P_{batC}$ shown in FIG. 15 is the smallest. From the viewpoint of the charge speed, since the larger the active power component vector $P_{batC}$ is, the more favorable the charge speed is, the second voltage command vector $V^*_2$ may be determined from such a viewpoint.

In FIGS. 13 to 16, the end point A2 of the second voltage command vector $V^*_2$ overlaps the circumference of the first imaginary circle S1. Therefore, the size (i.e. length) of the second reactor voltage vector $V_{r2}$ can be made the same size (i.e. length) as the first reactor voltage vector $V_{r1}$.

FIG. 16 illustrates an imaginary arc portion $L_{arcref}$. The imaginary arc portion $L_{arcref}$ is a portion extending between a first reference intersection point Ax1 and a second reference intersection point Ax2 in the circumference of the first imaginary circle S1. The first reference intersection point Ax1 is one intersection point among the points where the first imaginary circle S1 and the second imaginary circle S2 intersect, and the point is closer to the end point of the first voltage command vector $V^*_1$. The second reference intersection point Ax2 is an intersection point of the first imaginary circle S1 and the power supply voltage vector $V_S$.

It should be noted that, although the first reference intersection point Ax1 is included in the imaginary arc portion $L_{arcref}$, the second reference intersection point Ax2 is not included in the imaginary arc portion $L_{arcref}$.

The command value generating part 10 may generate the second command value $PQ^*_2$ so that the end point A2 of the second voltage command value vector $V^*_2$ overlaps with the imaginary arc portion $L_{arcref}$. The command value generating part 10 may generate the second command value $PQ^*_2$ so that the end point A2 of the second voltage command value vector $V^*_2$ is located inside or outside the first imaginary circle S1.

In FIG. 16, a predetermined region $R_{Vref2}$ is indicated by a dotted pattern. The predetermined region $R_{Vref2}$ is a region which is defined in advance so as to be surrounded by the first imaginary circle S1, the second imaginary circle S2, and the power supply voltage vector $V_S$ and so as not to include the power supply voltage vector $V_S$. The command value generating part 10 may generate the second command value $PQ^*_2$ so that the end point A2 of the second voltage command value vector $V^*_2$ is located inside or outside the predetermined region $R_{Vref2}$.

The third reference intersection point Ax3 shown in FIG. 16 is an intersection point of the first voltage command vector $V^*_1$ and the first imaginary circle S1. The command value generating part 10 may generate the second command value $PQ^*_2$ so that the end point A2 of the second voltage command value vector $V^*_2$ coincides with the third reference intersection point Ax3. Thus, the first voltage command value vector $V^*_1$ and the second voltage command value vector $V^*_2$ may have the same delay phase $\theta_2$.

[Example of Specific Control of Embodiments]

Figure 18:
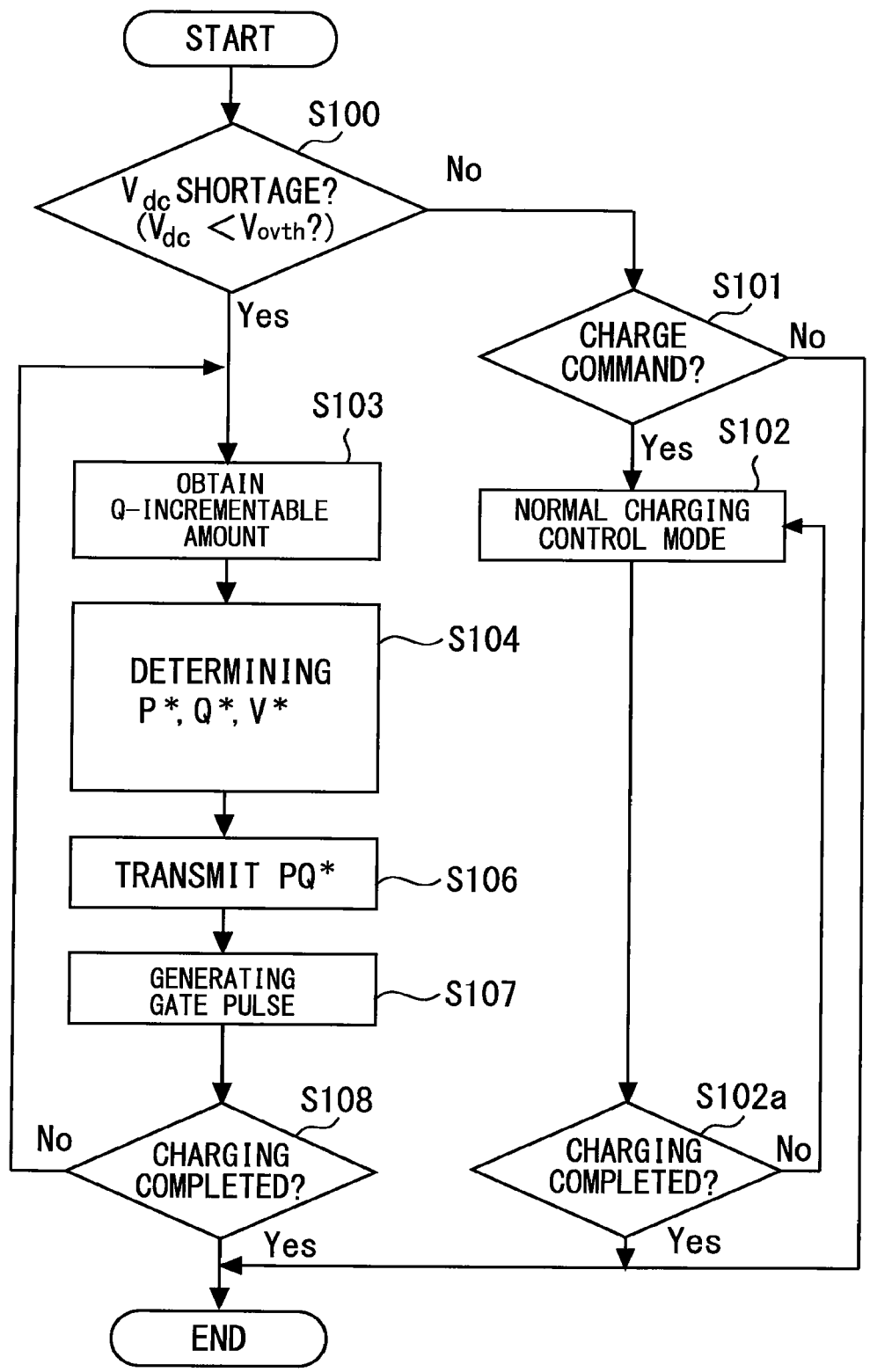
FIG. 18 is a voltage vector diagram for explaining an operation of a power conversion system according to a modification of the embodiment.

FIG. 18 is a flowchart showing an example of a control routine executed in the power conversion system 1 according to the embodiment. The routine of FIG. 18 is an example of a routine for selectively using a normal charging control mode and an over-discharge-state charging control mode. The routine of FIG. 18 is executed by the cooperation of the command value generating part 10 and the power conversion control circuit 4. The routine of FIG. 18 is repeatedly executed at predetermined intervals.

In the flow chart of FIG. 18, first, it is determined whether or not the voltage $V_{dc}$ of the storage battery 2 is insufficient (step S100). In this step, it is determined whether or not the voltage $V_{dc}$ is lower than a predetermined over-discharge threshold value $V_{ovth}$. The over-discharge threshold value may be, for example, the same value as the lower limit voltage set value $V_{Llmt}$ shown in FIG. 4, or may be another threshold value determined to be larger or smaller than the lower limit voltage set value $W_{Llmt}$. When $V_{dc} < V_{ovth}$ is satisfied in the step S100, it is determined that the voltage $V_{dc}$ is insufficient because the voltage $V_{dc}$ is too low.

If it is determined in step S100 that the voltage $V_{dc}$ is not insufficient, the processing proceeds to step S101. In step S101, it is determined whether or not a charging command has been issued. A condition under which the charging command is issued may be determined based on various known techniques, and therefore detailed description thereof is omitted here. When the charging command is not issued in the step S101, the storage battery 2 is not over-discharged and the charging command is not issued, so that the present routine is terminated.

When the charging command is issued in the step S101, the charging command is issued although the storage battery 2 is not over-discharged. Therefore, the normal charging control mode is executed (step S102). The normal charging control mode is a charging control mode when the voltage $V_{dc}$ of the storage battery 2 is not lower than the over-discharge threshold value $V_{ovth}$.

The command value generating part 10 generates a first command value $PQ^*_1$ for the normal charging control mode. The first command value $PQ^*_1$ in the embodiment is a command value for causing the power conversion circuit 3a to output an output voltage corresponding to the first voltage command value vector $V^*_1$ of FIG. 9 described above.

After the normal charging control mode is started, if it is determined that charging is completed by satisfying a predetermined charging termination condition, the normal charging control mode is terminated (step S102a). Thereafter, the present routine ends.

If it is determined in step S100 that the voltage $V_{dc}$ is insufficient, the processing of steps S103 to S107 is executed. The processing of steps S103 to S107 is a charging control mode for the case where the storage battery 2 is in the over-discharge state.

The specific control in FIG. 18 includes a step S103 as a preferable control. The step S103 is a step in which the command value generating part 10 generates the reactive power command value Q* so that the reactive power outputted by the power conversion circuit 3a does not exceed a reactive power upper limit value at a connection point between the power conversion circuit 3a and the AC power source 100.

In step S103, a present reactive power upper limit value Qlmt is first obtained. The reactive power upper limit value Qlmt is a value that defines the upper limit of the reactive power outputted by the power conversion system 1 to a grid interconnection point between the power conversion system 1 and the AC power supply 100. The reactive power upper limit value Qlmt may be acquired in accordance with the present operation conditions of the power conversion system 1 and the AC power supply 100, or may be acquired in the form of system information or the like from a high-order monitoring device or a power company.

A difference between the reactive power upper limit value Qlmt and the reactive power measurement value Q currently outputted by the power conversion system 1 corresponds to a "Q-incrementable amount". The "Q-incrementable amount" is an amount to which the power conversion system 1 can increase reactive power at the present time.

Next, processing to determine the active power command value P* and the reactive power command value Q* is performed (step S104). In order to suppress the inverter overmodulation, the second voltage command vector $V^*_2$ needs to be set to be shorter to some extent or more. On the other hand, in order to increase a charging speed, the active power component vector $P_{batC}$ illustrated in FIGS. 13 to 15 is preferably as long as possible. Further, it is preferable that the reactive power command value Q* is set within a range that does not exceed the Q-incrementable amount.

From these plural points of view, candidates for the second voltage command vector $V^*_2$ can be assumed. In the embodiment, as one of specific examples of control, a nonvolatile memory of the command value generating part 10 stores in advance a correspondence rule in which a plurality of Q-incrementable amounts and a plurality of second voltage command value vectors $V^*_2$ are associated with each other, and the second voltage command value vectors $V^*_2$ are used selectively and variably in accordance with this correspondence rule.

Next, the command value generating part 10 transmits the second command value $PQ^*_2$ for the over-discharge-state charging control mode to the power conversion control circuit 4 (step S106). The power conversion control circuit 4 controls the power conversion circuit 3a in accordance with the second command value $PQ^*_2$, so that the power conversion circuit 3a can output the output voltage corresponding to the second voltage command value vector $V^*_2$.

Next, a gate pulse is generated based on the second command value $PQ^*_2$ (step S107). The gate pulse is generated by the gate pulse generating part 4f in the power conversion control circuit 4.

Thereafter, when it is determined that the charging is completed by satisfying the predetermined charging termination condition, the over-discharge-state charging control mode is terminated (step S108). The predetermined charging termination condition may be satisfied, for example, when $V_{dc} \geq V_{ovth}$ is satisfied. Alternatively, the predetermined charging termination condition may be satisfied when, for example, $V_{ac} \geq (V_{ovth} + \alpha)$ is satisfied, and α is a positive correction value determined in advance. Thereafter, the present routine ends.

As a modification of the flow chart of FIG. 18, the step S103 may be omitted when variable setting of the second voltage command vector $V^*_2$ corresponding to the Q-incrementable amount is not performed. In this case, the same second command value $PQ^*_2$ may be generated in the over-discharge-state charging control mode every time, based on one second voltage command value vector $V^*_2$ set in advance.

Figure 19:
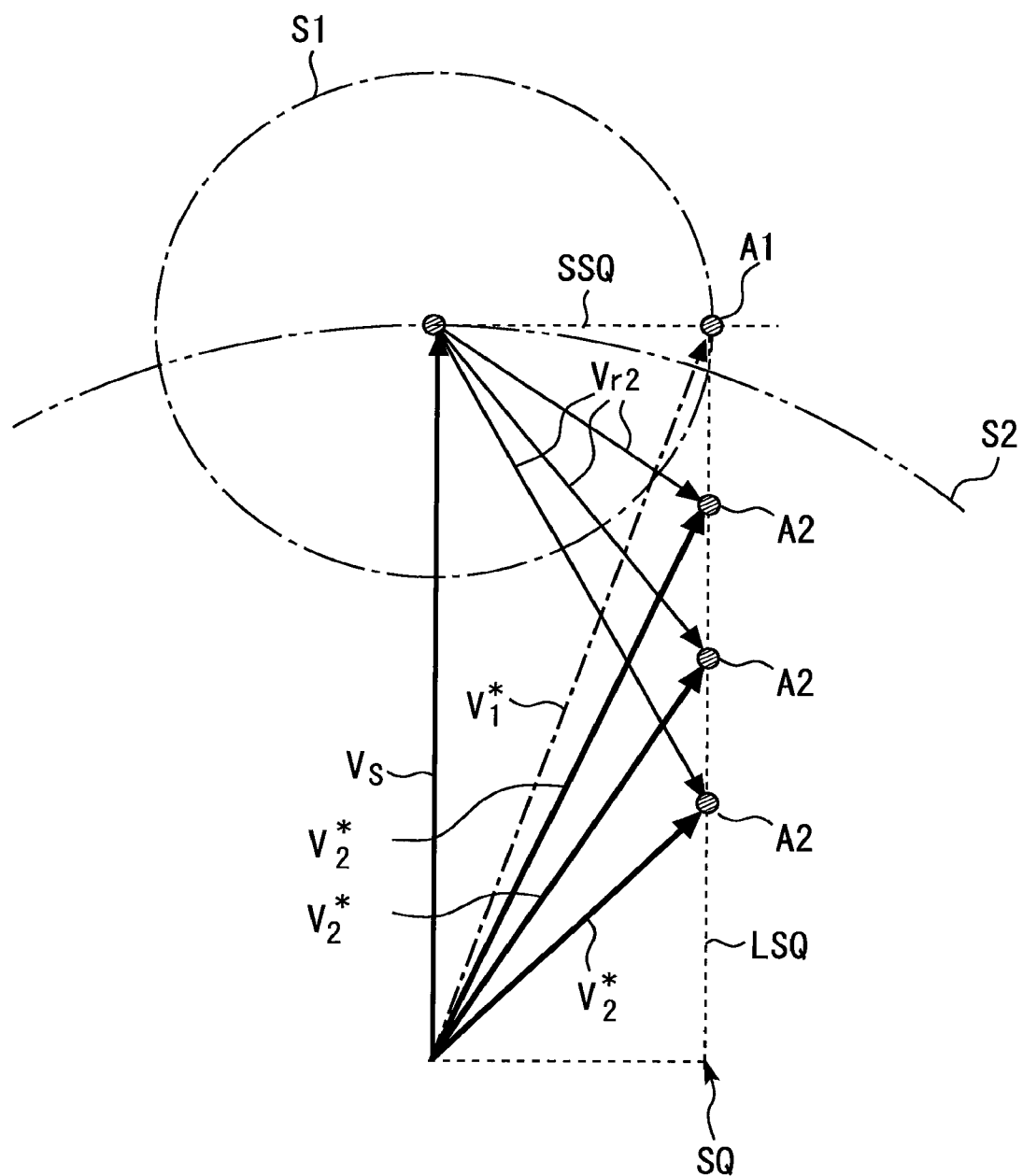
FIG. 19 is a voltage vector diagram for explaining an operation of a power conversion system according to a modification of the embodiment.

FIG. 19 is a voltage vector diagram for explaining the operation of the power conversion system 1 according to the modification of the embodiment. FIG. 19 illustrates an imaginary quadrangle SQ. A first long side of the imaginary quadrangle SQ is the power supply voltage vector $V_S$. A diagonal line of the imaginary quadrangle $S_Q$ is the first voltage command vector $V^*_1$. The command value generating part 10 may generate the second command value $PQ^*_2$ so that the end point A2 of the second voltage command value vector $V^*_2$ overlaps a second long side LSQ that is parallel to the first long side.

Figure 20:
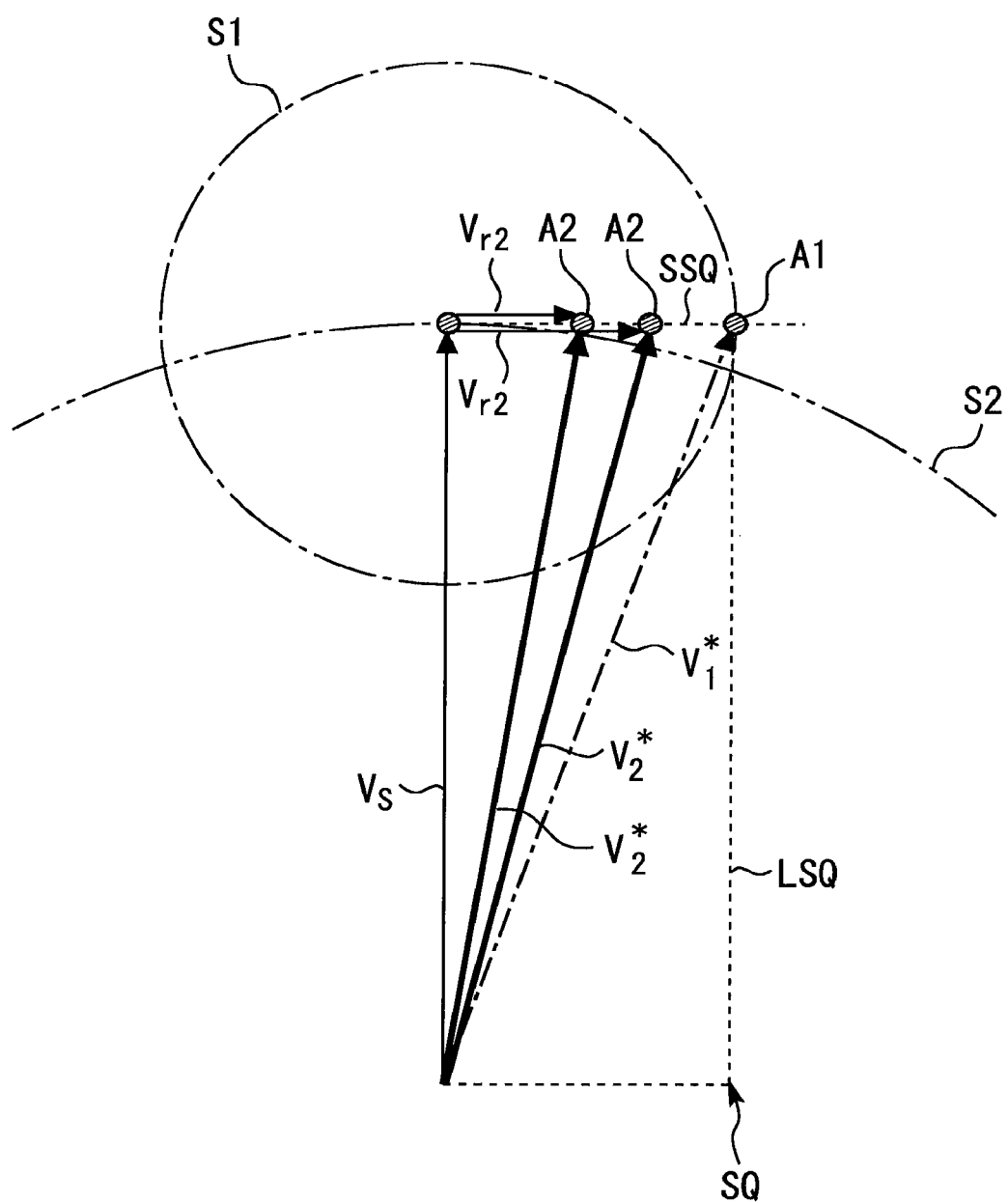
FIG. 20 is a voltage vector diagram for explaining an operation of a power conversion system according to another modification of the embodiment.

FIG. 20 is a voltage vector diagram for explaining the operation of the power conversion system 1 according to another modification of the embodiment. A first short side SSQ of the imaginary quadrangle SQ matches the first reactor voltage vector $V_{r1}$ obtained by composing the power supply voltage vector $V_S$ and the first voltage command vector $V^*_1$. The diagonal line of the imaginary quadrangle SQ is the first voltage command vector $V^*_1$. The command value generating part 10 may generate the second command value PQ*₂ so that the end point A2 of the second voltage command value vector V*₂ overlaps with the first short side SSQ.

The second voltage command vector V*₂ may be provided such that the end point thereof is located on the outer side of the imaginary quadrangle SSQ. As long as the second voltage command value vector V*₂ has a delayed second delay phase θ₂ and generates a reactor voltage for charging the storage battery 2, various second voltage command value vector V*₂ are provided. This is because, it possible to suppress the inverter overmodulation caused by a voltage shortage of the storage battery 2 by reducing the size (i.e. length) of the second voltage command value vector V*₂ in the over-discharge-state charging control mode compared with the first voltage command value vector V*₁ in the normal charging control mode.

Figure 21:
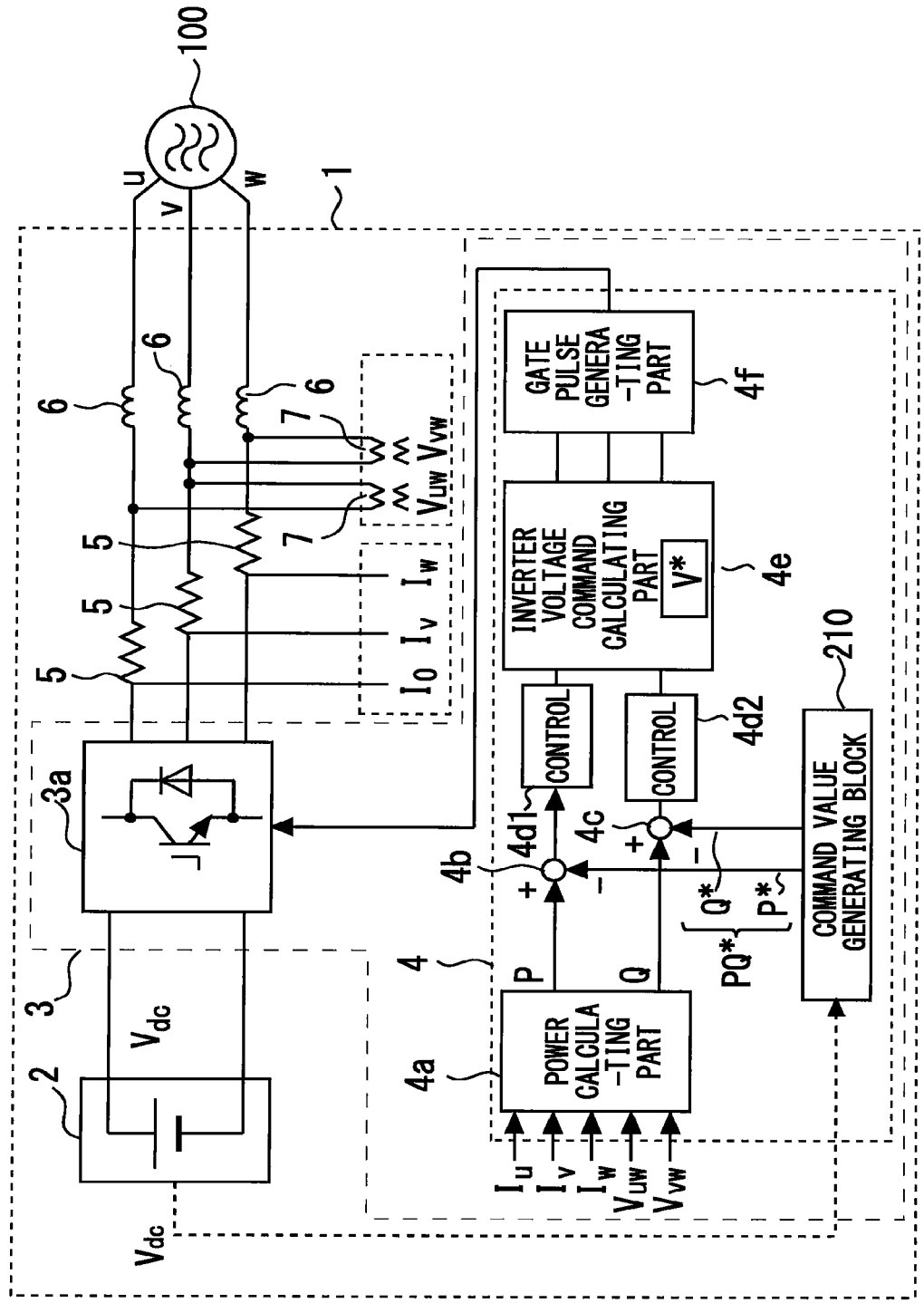
FIG. 21 is a schematic configuration diagram illustrating a power conversion system according to a modification of the embodiment.

FIG. 21 is a schematic configuration diagram showing a power conversion system 1 according to a modification of the embodiment. Instead of the command value generating part 10, a command value generating block 210 provided inside the power conversion control circuit 4 may be provided. The command value generating block 210 is configured to execute the same functions, control operations, and control routines as those of the command value generating part 10 described above.

It should be noted that the storage battery 2 may be used so that a range from SOC=0% to SOC=100% is exhausted, may not be used so. For example, SOC=10% or the like may be set as a SOC lower limit value, SOC=90% or the like may be set as a SOC upper limit value, and the storage battery 2 may be used within a range from the SOC lower limit value to the SOC upper limit value. If the SOC lower limit value is set for the storage battery 2, it should be avoided to cause a state in which the remaining capacity of the storage battery 2 is lower than the SOC lower limit value.

If a relation with the SOC lower limit value is considered, the following at least two examples are provided based on the above embodiment.

As a first example, even if the SOC lower limit value is set, the content of the above-described embodiment shown in the flow chart of FIG. 13 may be applied, and then the over-discharge threshold value $V_{ovth}$ for the processing of the step S100 may be determined based on the $V_{Llmt}$. This is because, when the power conversion device 3 is configured, for example, so as not to cause the problem of the inverter overmodulation when the SOC exceeds 0%, the normal charging control mode can be applied even if the SOC of the storage battery 2 is below the SOC lower limit value.

On the other hand, as a second example, the over-discharge threshold value $V_{ovth}$ for the processing of the above-described step S100 may be based on a voltage of the storage battery 2 corresponding to the SOC lower limit value (e.g., SOC10%). In such a second example, the over-discharge threshold value may be a voltage that is somewhat higher than the $V_{Llmt}$ which is the physical upper limit voltage of the storage battery 2.

In the embodiment, as an example, the reactor 6 is used as the "interconnection inductance". The interconnection inductance is an inductor provided at a grid interconnection point. As a modification, in the power conversion system 1, an interconnection transformer may be installed instead of the reactor 6. In this case, the configuration and the control content of the above-described embodiments may be implemented by replacing the "reactor current" and the "reactor voltage" in the above-described embodiment with the current and voltage of the interconnection transformer of each phase. The "reactor current", the "reactor voltage", the "reactor current vector", and the "reactor voltage vector" in the above embodiments may be referred to as an "interconnection inductance current", an "interconnection inductance voltage", an "interconnection inductance current vector", and an "interconnection inductance voltage vector", respectively, in a superordinate concept.

REFERENCE SIGNS LIST

1 Power conversion system
2 Storage battery
3 Power conversion device
3a Power conversion circuit
4 Power conversion control circuit
4a power calculating part
4b Active power subtracting part
4c Reactive power subtracting part
4d1 Active power control part
4d2 Reactive power control part
4e Inverter voltage command calculating part
4f Gate pulse generating part
5 Current transformer
6 Reactor (interconnection inductance)
7 Potential transformer
10 Command value generating part (MSC)
100 AC power supply
101 Three-phase AC voltage source
210 Command value generating block
Ax1 First reference intersection point
Ax2 Second reference intersection point
Ax3 Third reference intersection point
$I_r$ Reactor current (interconnection inductance current)
P Active power measured value
P* Active power command value
$P_{batC}$ Active power component vector
PQ* Command values
Q Reactive power measured value
Q* Reactive power command value
$Q_{batC}$ Reactive power vector
Qlmt Reactive power upper limit
$V_s$ Power supply voltage vector
V* Voltage command value vector
V*₁ First voltage command value vector
V*₂ Second voltage command value vector
$V_a$ Inverter voltage
$V_b$ Overmodulation inverter voltage
$V_{dc}$ Storage battery voltage
$V_{Hlmt}$ Upper limit voltage set value
$V_{Llmt}$ Lower limit voltage set value
$V_{ovth}$ Over-discharge threshold value
$V_r$ Reactor voltage (Interconnection inductance voltage)
$V_{r1}$ First reactor voltage vector (First interconnection inductance voltage Vector)
$I_{r1}$ First reactor current vector (First interconnection inductance current Vector)
$V_{r2}$ Second reactor voltage vector (Second interconnection inductance voltage Vector)
θ₁ First delay phase
θ₂ Second delay phase
S1 First imaginary circle
S2 Second imaginary circle
$R_{Vref2}$ Predetermined region
SQ Imaginary quadrangle
$L_{arcref}$ Imaginary arc

The invention claimed is:

1. A power conversion system comprising:
a power conversion circuit having a DC side connected to a storage battery and having an AC side connected to an AC power source via an interconnection inductance;
a power conversion control circuit having a charging control mode for controlling the power conversion circuit to take in power from a side of the interconnection inductance to the storage battery via the power conversion circuit; and
a command value generating part configured to generate a command value for executing the charging control mode,
wherein the charging control mode included in the power conversion control circuit is a mode for controlling an output voltage of the power conversion circuit such that an interconnection inductance voltage is applied to the interconnection inductance, and the interconnection inductance voltage is determined by a power supply voltage vector of the AC power supply and a voltage command value vector having a delay phase with respect to the power supply voltage vector and having a magnitude and a phase based on the command value,
wherein the command value generating part generates a first command value for an operation of the charging control mode when a voltage of the storage battery is not lower than a predetermined over-discharge threshold value, and generates a second command value for an operation of the charging control mode when the voltage of the storage battery is lower than the over-discharge threshold value,
wherein the first command value is a command value for causing the power conversion circuit to output an output voltage corresponding to a first voltage command value vector having a first magnitude and a first delay phase, and
wherein the second command value is a command value for causing the power conversion circuit to output an output voltage corresponding to a second voltage command value vector having a second magnitude smaller than the first magnitude.

2. The power conversion system according to claim 1,
wherein a first interconnection inductance voltage vector is defined such that the first interconnection inductance voltage vector is a vector representing the interconnection inductance voltage when the power supply voltage vector and the first voltage command value vector are composed,
wherein a first imaginary circle is defined such that the first imaginary circle is an imaginary circle consisting of a locus of an end point of the first interconnection inductance voltage vector when the end point of the first interconnection inductance voltage vector turns around a start point of the first interconnection inductance voltage vector,
wherein the command value generating part generates the second command value such that an end point of the second voltage command value vector overlaps a circumference of the first imaginary circle.

3. The power conversion system according to claim 2,
wherein a second imaginary circle is defined such that the second imaginary circle is an imaginary circle consisting of a locus of an end point of the power supply voltage vector when the end point of the power supply voltage vector turns around a start point of the power supply voltage vector,
wherein one intersection point among a plurality of intersections where the first imaginary circle and the second imaginary circle intersect is defined as a first reference intersection point, the first reference intersection point is closer to the end point of the first voltage command value vector,
wherein an intersection point where the first imaginary circle and the power supply voltage vector intersect is defined as a second reference intersection point,
wherein an imaginary arc portion is defined such that the imaginary arc portion is a portion of the circumference of the first imaginary circle that extends between the first reference intersection point and the second reference intersection point, the imaginary arc portion includes the first reference intersection point and does not include the second reference intersection point, and
wherein the command value generating part generates the second command value such that the end point of the second voltage command value vector overlaps with the imaginary arc portion.

4. The power conversion system according to claim 1,
wherein a vector representing the interconnection inductance voltage when the power supply voltage vector and the first voltage command value vector are composed is defined as a first interconnection inductance voltage vector,
wherein a first imaginary circle is defined such that the first imaginary circle is an imaginary circle consisting of a locus of an end point of the first interconnection inductance voltage vector when the end point of the first interconnection inductance voltage vector turns around a start point of the first interconnection inductance voltage vector, and
wherein the command value generating part generates the second command value such that an end point of the second voltage command value vector is located inside the first imaginary circle.

5. The power conversion system according to claim 4,
wherein a second imaginary circle is defined such that the second imaginary circle is an imaginary circle consisting of a locus of an end point of the power supply voltage vector when the end point of the power supply voltage vector turns around the start point of the power supply voltage vector,
wherein a predetermined region is defined such that the predetermined region is a region surrounded by the first imaginary circle, the second imaginary circle, and the power supply voltage vector, and the predetermined region does not include the power supply voltage vector, and
wherein the command value generating part generates the second command value such that the end point of the second voltage command value vector is located inside the predetermined region.

6. The power conversion system according to claim 1, wherein the command value generating part generates the second command value such that reactive power outputted by the power conversion circuit does not exceed a reactive power upper limit value at a connection point between the power conversion circuit and the AC power source.

7. The power conversion system according to claim 1, wherein the command value generating part generates the second voltage command value vector such that the second voltage command value vector has a second delay phase that is a phase delayed greater than the first delay phase from the power supply voltage vector.

8. The power conversion system according to claim 1, wherein the command value generating part generates the second voltage command value vector such that the second voltage command value vector has a second delay phase which is an advanced phase from the first delay phase with respect to the power supply voltage vector.

9. The power conversion system according to claim 1, wherein the command value generating part generates the second command value so that the second voltage command value vector has a phase equal to the first delay phase.

10. The power conversion system according to claim 1, wherein, an imaginary quadrangle is defined such that the imaginary quadrangle is a quadrangle in which the power supply voltage vector is a first long side thereof and the first voltage command value vector is a diagonal line thereof, and the command value generating part generates the second command value such that an end point of the second voltage command value vector overlaps a second long side parallel to the first long side in the imaginary quadrangle.

11. The power conversion system according to claim 1, wherein the command value generating part generates the second command value such that an end point of the second voltage command value vector overlaps a first short side in an imaginary quadrangle, the imaginary quadrangle has the first short side as a first interconnection inductance voltage vector and has the first voltage command value vector as a diagonal line, and the first interconnection inductance voltage vector is obtained by composing the power supply voltage vector and the first voltage command value vector.

12. The power conversion system according to claim 2, wherein the command value generating part generates the second command value such that reactive power outputted by the power conversion circuit does not exceed a reactive power upper limit value at a connection point between the power conversion circuit and the AC power source.

13. The power conversion system according to claim 3, wherein the command value generating part generates the second command value such that reactive power outputted by the power conversion circuit does not exceed a reactive power upper limit value at a connection point between the power conversion circuit and the AC power source.

14. The power conversion system according to claim 4, wherein the command value generating part generates the second command value such that reactive power outputted by the power conversion circuit does not exceed a reactive power upper limit value at a connection point between the power conversion circuit and the AC power source.

15. The power conversion system according to claim 5, wherein the command value generating part generates the second command value such that reactive power outputted by the power conversion circuit does not exceed a reactive power upper limit value at a connection point between the power conversion circuit and the AC power source.

* * * * *